July 8, 1924.   1,500,248
F. P. LEWIS
MEANS FOR TESTING VISION
Filed Aug. 17, 1922
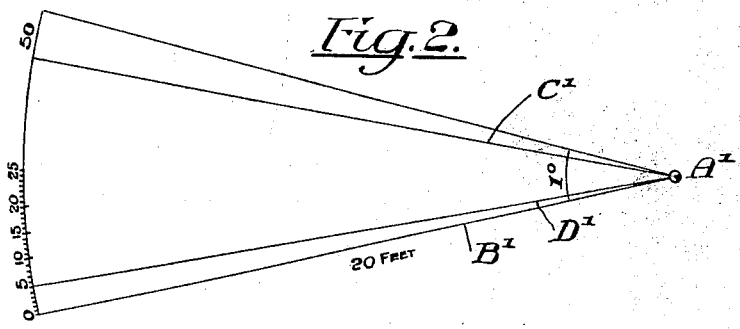
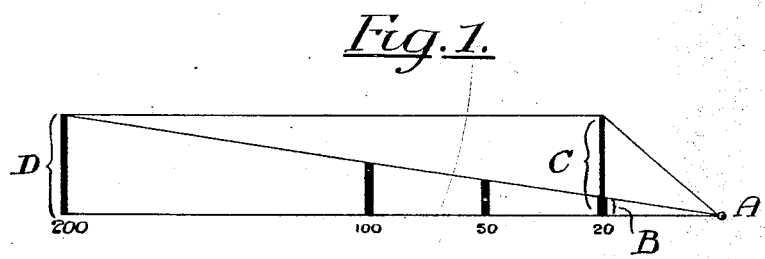
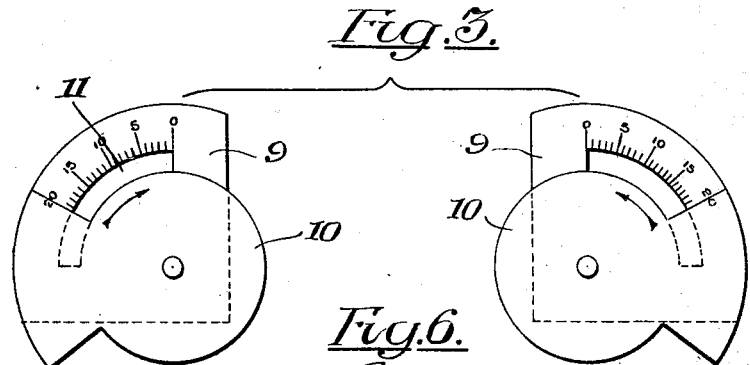
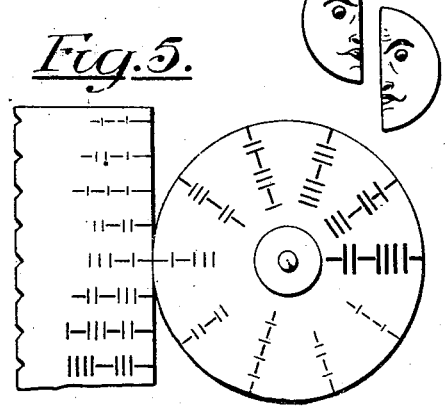
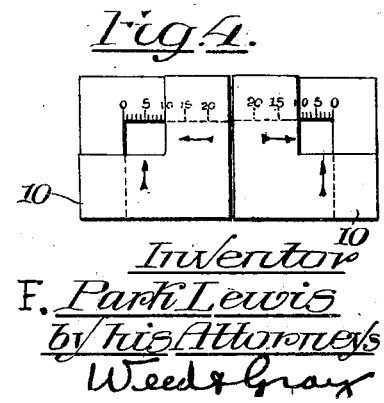
Inventor
F. Park Lewis
by his Attorneys
Weed & Gray

Patented July 8, 1924. 1,500,248

UNITED STATES PATENT OFFICE.

FRANCIS PARK LEWIS, OF BUFFALO, NEW YORK.

METHOD FOR TESTING VISION.

Application filed August 17, 1922. Serial No. 582,369.

*To all whom it may concern:*

Be it known that I, FRANCIS PARK LEWIS, a citizen of the United States, residing at Buffalo, in the county of Erie and State of New York, have invented certain new and useful Improvements in Methods for Testing Vision, of which the following is a specification.

This invention relates to the method of testing or determining vision, an object of the invention being to provide a method of making an objective measure for the subjective determination of visual acuity.

A further object of this invention is to provide a comparative method of testing or measuring the visual acuity. Thus, for instance where it is sought to determine which of a plurality of objects or characters of different graduated values is distinguishable by the eye with the greatest acuity, the present method contemplates the simultaneous comparison by the patient of such objects or characters with other objects selected either by the patient or otherwise to have a similar or complementary value.

A further object of this invention is to provide a comparative method for the determination of vision consisting in exposing to the eye a symbol or character of predetermined value and simultaneously comparing therewith a symbol or character selected to have a corresponding or complementary value.

A further object of this invention is to provide a method for testing or determining vision by a finely graduated scale of objects or values at a fixed distance from the eye in terms of the visual angles subtended thereby.

A further object of this invention is to provide a method for testing vision by matching symbols, characters, figures, objects or the like of different amplitudes or values, or by exposing to the eye a predetermined character and causing the patient to approximate thereto or aline therewith a corresponding character.

A further object of this invention is to provide an improved test for astigmatism which may consist in exposing to the eye a character or the like of certain value and after causing the patient to aline with said character a corresponding one, then shifting the alined characters so as to determine the axis of astigmatism.

Other objects of this invention will appear in the following description thereof and in the accompanying drawing forming a part of this specification Fig. 1 is a diagram intended to illustrate the conventional fractional method for visual measurement; Fig. 2 is a diagram illustrating the method of measurement by the visual angle; Fig. 3 is a diagram illustrating a way in which my method may be carried out; Fig. 4 is a diagram illustrating a further plan for carrying out my method; and Figs. 5 and 6 are diagrams illustrating further ways for carrying out my invention.

Heretofore vision has been tested or determined by making measurements upon an entirely arbitrary basis, characters of different sizes and representing a jumping scale of values being exposed to the eye and named by the person examined. Measurements have always been recorded in fractional terms; i. e. 20/20ths, 20/30ths, etc., and hence as a result of the foregoing methods it has been impossible to arrive at anything other than an approximate eye test or to accurately measure fine differences in vision. Referring to Fig. 1, the eye of the patient or observer is indicated at A, and assuming that the object B should be clearly visible to the normal eye at twenty feet or the object D at two hundred feet, it will be seen that both objects subtend the same angle of vision. The shorter distance is usually used for convenience in testing, and if the object D, which should be clearly seen at two hundred feet by the normal eye, is the smallest object, namely, C, that can be distinguished at twenty feet, the visual record for that eye would be 20/200ths instead of 20/20ths. Considerable doubt has been expressed by ophthalmologists as to whether the proportionate values at the several distances are maintained, or whether 20/200ths is better vision than 1/10th of 20/20ths. Such a standard of measurement as heretofore used, is arbitrary, and where the measurements jump substantial distances such as twenty or thirty to fifty feet, it is impossible to obtain an accurate graduated visual record.

As a result of the present method however instead of recording by means of the fractional method such as 20/30ths 20/40ths, 20/50ths, etc., I contemplate using a graduated scale of values located at a fixed distance from the eye and read or measured in the terms of the angle of vision rather than in fractional form. Thus I propose to use the visual angle as a standard of measure rather than the fraction.

In the diagram shown in Fig. 2 the enlarged angle represents one degree of a circle, and an object of predetermined amplitude located at twenty feet from the normal eye of a patient at A' would subtend an angle of five minutes indicated between the lines B' and D'. It will of course be seen that a considerably larger object might be the smallest that could be seen by the eye from the point A', which might be denoted by the angle fifty minutes between the lines B' and C'. Thus whatever the size or amplitude of the object distinguished by the eye of the patient or person examined at twenty feet, the acuity of vision by my improved method would be represented by the visional angle, namely, five minutes, six minutes, ten minutes, etc. The value of this system resides in the fact that it permits a degree of accuracy in recording the tests of the eyes which would be scientifically correct, as the graduated values may be minutely determined through measurements in terms of the angle of vision rather than upon an arbitrary fractional basis as heretofore.

This method may be carried out, for example, by means of a sliding scale as shown in either Fig. 3 or Fig. 4. Thus in the diagram of Fig. 3 there might be employed a suitable fixed plaque 9 having a circular opening provided with a marginal graduated scale, and a revolving plaque 10 might be rotated in the direction of the arrow so as to expose less and less of the black or other colored background 11 until the smallest exposed surface representing the lowest visual angle is reached. At this point, indicating the limit of vision, assuming that the eye of the patient is located at a predetermined distance, as twenty feet, from the test apparatus, the examiner will read or measure the angle of vision in minutes.

Heretofore in testing vision it has been the practice to display or exhibit to the individual to be examined a series of letters of different sizes, which the patient names. Upon approaching the limit of vision it has been found impossible on the one hand to accurately determine the exact point where characters of diminishing value or size can be distinguished by the eye, and on the other hand it has been found particularly difficult, if not impossible, to obtain correct results when examining the eyes to ascertain which of a series of characters of different sizes the patient distinguishes or sees with the greatest degree of clearness. By virtue of my method the determination of vision is not formed upon an arbitrary basis, and an exact rather than an approximate measure is obtained, the acuity of vision being determined on the basis of comparative values or by causing the patient to simultaneously compare or match or bring into juxtaposition separate characters or objects of independent series or sets of devices. It is therefore possible to determine which of a plurality of surfaces of different values of one device or series is distinguished by the eye with the greatest acuity by the process of simultaneously comparing with the same a surface or surfaces selected by the patient from an independent device or series to have corresponding or complementary value. The method may be carried out by successively exposing to the eye a series of symbols of graduated sizes and causing the patient to select similar characters from a different series to match or aline with the characters of the first series.

The comparative method is valuable in order to determine accurately the visual acuity by the correct angle of vision, since the values are so finely graduated that upon approaching the limit of vision it is impossible for the patient to distinguish between graduations, that is, to state accurately whether one symbol or value can be discerned better than the next symbol or value in the scale. By comparing however with other symbols, the exact point of visual acuity is determinable.

Any suitable mechanism may of course be used to carry out the method indicated in the diagrams in Figs. 3 and 4, the plaques 10 in these cases being shifted for the purpose of varying the diaphragmatic opening until the smallest space distinguished by the eye is reached. A sliding scale indicating visual angles measures the surface which is exposed to the eye and in order that the measure of vision may be accurately determined two similar apparatus or devices side by side are used and the patient is required to operate or cause to operate one of the devices of either Fig. 3 or Fig. 4 so as to expose a surface corresponding with that of the other device. Any suitable figures or characters may be employed, such for instance as half figures as shown in Fig. 6, which may be desirable for testing illiterates, children, or those unable to read English letters. The acuity of vision may in such instance be obtained by the patient selecting from a graduated series of half figures one which will be the complement of, or the opposed half of the figure or character which has been previously exposed to the eye. Thus, for instance if one half figure, face, or object of a graduated series were displayed, the patient would be called upon to select from an independent series a character which would match the one displayed or when juxtaposed therewith would complete the figure. As indicated in Fig. 5 the graduated lines of a slide may be successively exposed to the eye, and at the direction of the patient the rotating disc having similar lines may be shifted until a set of lines of the disc and slide are matched and alined. These may then be rotated for the purpose of determining whether such alinement is the vision for all radii of the circle, thereby determining the axis of astigmatism. In this case the lines or symbols of the sliding graduated scale are matched by lines or symbols of the rotating plane, the lines or symbols of the scale forming at a fixed distance definite angles of vision accurately measured in minutes.

It will be understood that any suitable mechanism may be employed to carry out the present method and the mechanism may be operated or motivated by the individual examined or by the examiner. The several diagrams shown are merely illustrative of the method and hence are not intended to limit the carrying out of the method to any particular mechanism or apparatus.

It will be understood that by describing in detail herein any particular form, structure or arrangement it is not intended to limit the invention beyond the terms of the several claims or the requirements of the prior art.

I claim as my invention:

1. The herein described method of testing vision which consists in exposing to the eye a symbol or character subtending at a fixed distance from the eye a predetermined visual angle, and matching said symbol with a corresponding symbol or character.

2. The herein described method of testing vision which consists in exposing to the eye a symbol of variable amplitude, decreasing the size of the symbol exposed until the approximate limit of vision is reached, and selectively matching said symbol with one of similar amplitude.

3. The herein described method of testing vision which consists in exposing to the eye a symbol or character subtending a predetermined visual angle at a fixed distance from the eye and causing the patient to match said symbol with a corresponding symbol or character.

4. The herein described method of testing vision, which consists in exposing to the eye a symbol or character subtending at a fixed distance from the eye a predetermined visual angle, matching said symbol with a corresponding symbol or character, and shifting said matched symbols to test for astigmatism.

5. The herein described method of determining the acuity of vision which consists in exposing to the eye a predetermined character or object, and causing the patient to approximate thereto a complementary character or object.

6. The herein described method of testing vision which consists in simultaneously displaying to the eye a pair of characters or symbols adapted to be compared, substituting for one character a character of different amplitude, and substituting for the other character a character having an amplitude to correspond with the amplitude of the substituted character.

7. The herein described method of determining the acuity of vision which consists in measuring by a sliding scale the visual angle subtended by a character or surface, and approximating thereto a similar character or surface.

8. The herein described method of testing vision which consists in simultaneously displaying to the eye a pair of characters or symbols of a pair of series, substituting characters of a different amplitude from one series, and substituting a character from the other series to correspond with any one of said first characters.

9. The herein described method of testing vision which consists in exposing to the eye a pair of characters of corresponding variable values, and substituting for any of said characters other characters of different values so that when corresponding values are simultaneously compared, the visual acuity may be determined.

10. The herein described method of testing vision which consists in displaying to the eye a character of predetermined value, matching and alining with said character a character of similar value, measuring the angle of vision subtended by said character, and rotating said alined characters to determine the axis of astigmatism.

11. The herein described method of determining the acuity of vision which consists in successively displaying to the eye symbols of graduated value, and determining the visual angle subtended by said symbols.

12. The herein described method of determining the acuity of vision which consists in successively displaying to the eye predetermined symbols of a graduated series, and causing said symbols to be matched by simultaneously comparing with symbols of another series.

13. The herein described method of determining the acuity of vision which consists in matching symbols of one graduated series with symbols of another graduated series.

14. The herein described method of testing vision which consists in successively displaying to the eye predetermined symbols of a series, and causing said symbols to be matched by comparing with symbols of another series, and measuring the visual angle subtended by said symbols.

15. The herein described method of testing vision which consists in matching symbols of one graduated series with symbols of another graduated series, and determining the visual angle subtended by any of said symbols.

16. The herein described method of determining the acuity of vision which consists in successively exposing symbols of graduated value to the eye, and alining with any of said symbols other symbols selected from an independent series.

17. The herein described method of determining the acuity of vision which consists in displaying to the eye one at a time characters of a graduated series, and causing the patient to select similar characters from another series.

18. In testing vision the herein described method of determining which of a plurality of objects of different values is distinguished by the eye with the greatest acuity, which consists in displaying one of said objects to the eye and simultaneously comparing such object with an object selected to have similar value.

19. The herein described method of determining the acuity of vision which consists in matching symbols of one graduated series with symbols of another graduated series, and shifting the matched symbols to test for astigmatism.

20. The herein described method of testing vision which consists in simultaneously comparing a symbol or character of predetermined size exposed to the eye, with a symbol or character selected to have a corresponding size.

21. The herein described method of testing vision which consists in exposing to the eye a character or object of predetermined value, alining with said character a similar character, and shifting said alined characters to determine the axis of astigmatism.

Signed at Buffalo, N. Y., this 10 day of August, 1922.

F. PARK LEWIS.